Oct. 23, 1934.  A. A. EWALD  1,977,907
PRESSURE REGULATING APPARATUS
Filed June 12, 1930  2 Sheets-Sheet 1
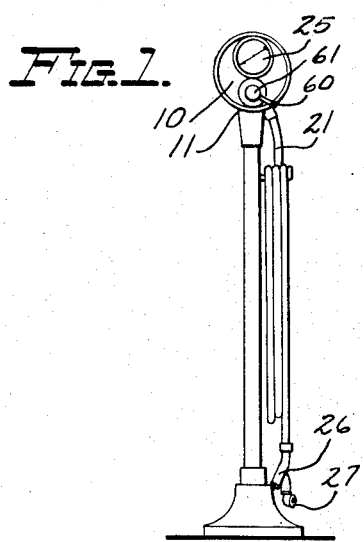
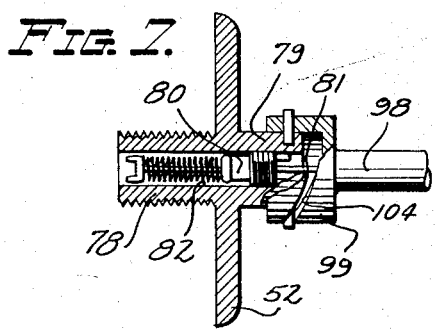
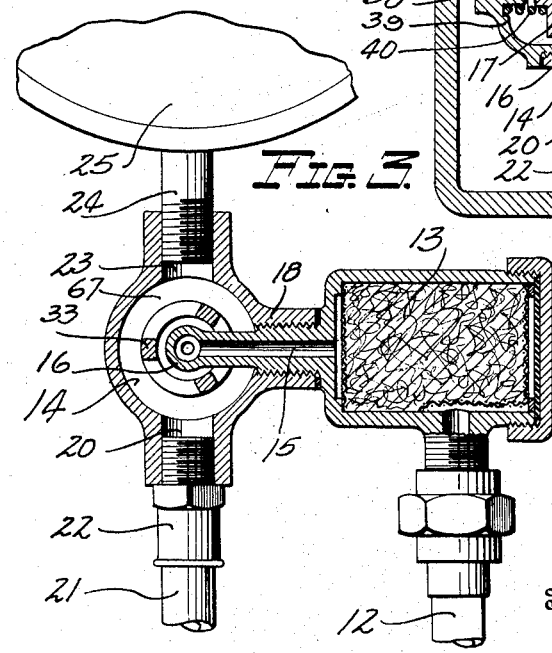
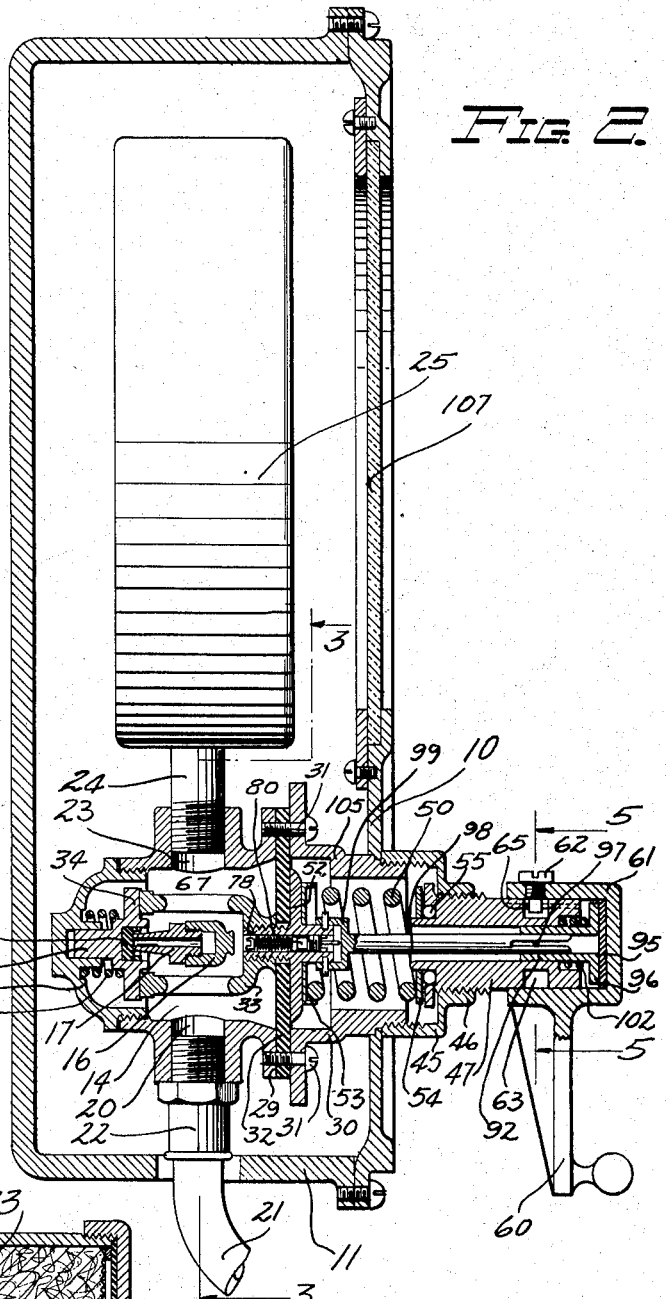
Inventor
Arno A. Ewald
By Wheeler, Wheeler & Wheeler
Attorneys Oct. 23, 1934.  A. A. EWALD  1,977,907
PRESSURE REGULATING APPARATUS
Filed June 12, 1930    2 Sheets-Sheet 2
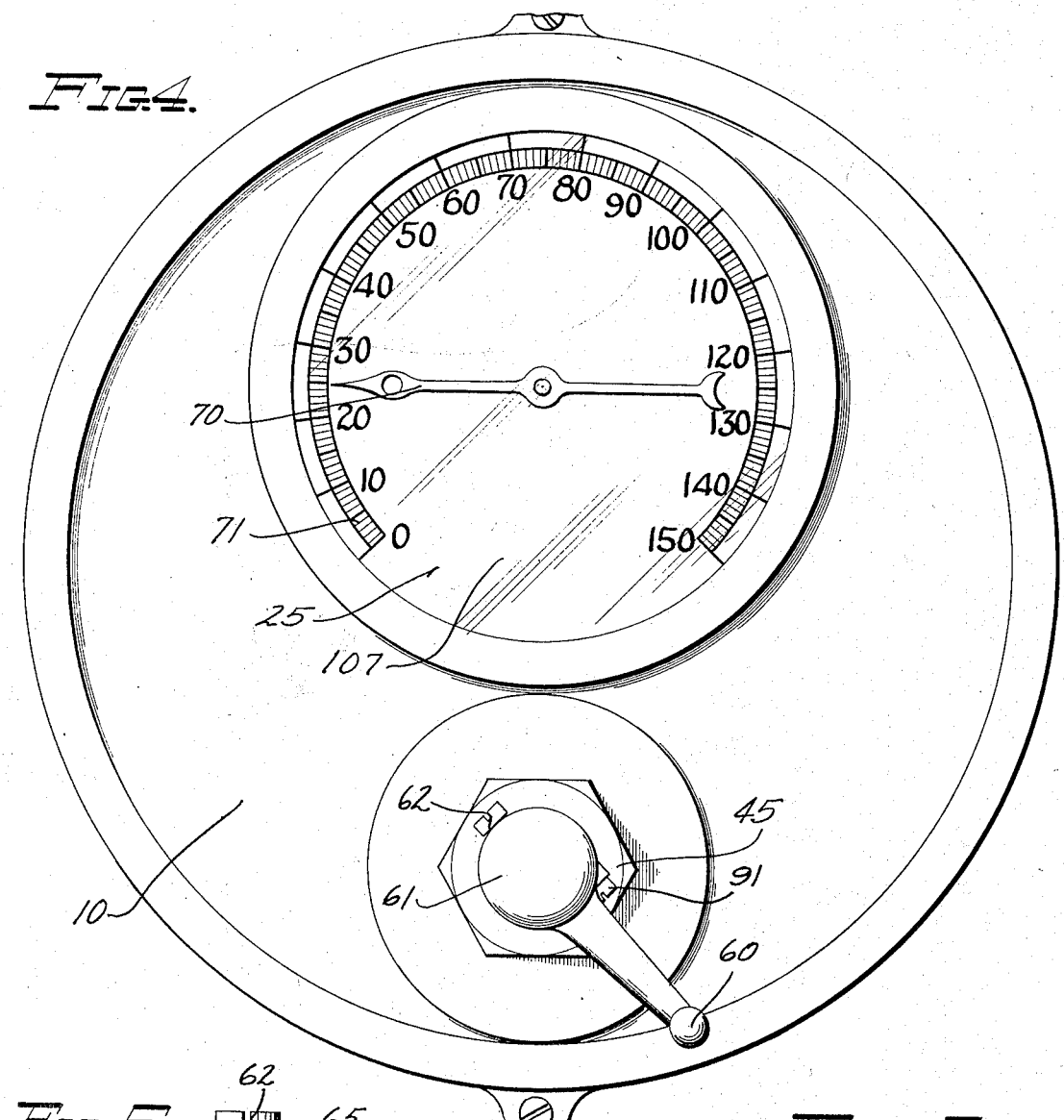
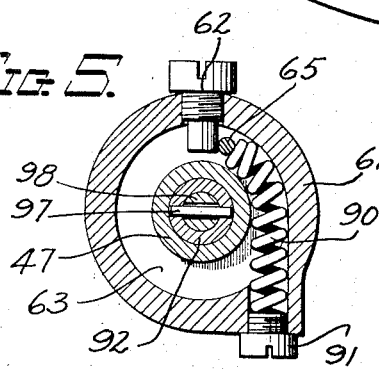
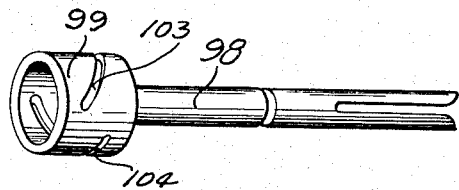
Inventor
Arno A. Ewald
By Wheeler, Wheeler, & Wheeler
Attorneys Patented Oct. 23, 1934

1,977,907

UNITED STATES PATENT OFFICE 1,977,907

PRESSURE REGULATING APPARATUS

Arno A. Ewald, Oakfield, Wis., assignor to Romort Manufacturing Company, Oakfield, Wis.

Application June 12, 1930, Serial No. 460,732

7 Claims. (Cl. 50—12)

My invention relates to improvements in pressure regulating apparatus with particular reference to apparatus of that class in which air or other elastic fluid is to be delivered at a predetermined pressure into a vehicle tire or other container from a source of supply at a higher pressure.

The objects of my invention are to equip pressure reducing apparatus with convenient and reliable means whereby an unskilled operator may adjust the apparatus for delivery of air or other elastic fluid through a non-adjustable co-operating pressure reducer in such volume as to develop exactly the desired pressure in a tire or other receiving container; to provide means whereby the manually controlled pressure reducer may be equipped with an indicator operated by the pressure at the outlet side of its valve to indicate the ultimate pressure to be attained in the tire or other container under any given adjustment; to provide means whereby pressure previously established on the outlet side of the control valve of the manually adjustable pressure reducer may be automatically relieved during adjustment in the direction of reduced pressure and thus permit the indicator to accurately show the ultimate delivered pressure to be attained by the new adjustment; and in general to provide means whereby air or other elastic fluid may be withdrawn from a reservoir or storage chamber in which it is contained at varying pressures and delivered to a tire or other container at desired lower pressures, to be determined and regulated by mere manipulation of a single crank or manually operable member movable in two directions for increase or reduction.

In the drawings:

Figure 1 is an elevation of an air supply station embodying my invention.

Figure 2 is a side elevation, partly in vertical section, of my improved pressure reducing apparatus.

Figure 3 is a sectional view drawn generally to line 3—3 of Figure 2.

Figure 4 is a front elevation of the parts shown in Figure 2, showing the indicator in its relation to the manually operable pressure regulating crank.

Figure 5 is a sectional view drawn to line 5—5 of Figure 2.

Figure 6 is a detail view of the bleeder valve operating rod.

Figure 7 is an enlarged detail view of the relief valve and associated parts, showing the same partly in longitudinal section.

Like parts are identified by the same reference characters throughout the several views.

The general organization of my apparatus, as applied to an air supply station used for inflating vehicle tires, is illustrated in Figure 1, in which a manually adjustable pressure regulator is mounted upon a generally circular face plate 10 carried by a support 11 through which air may be delivered from a suitable source of supply located underground or at any convenient point, a fragment of the air supply connection being shown at 12 in Figure 3.

This connection delivers the air into a filter chamber 13 connected with a valve chamber 14, the air passing through a tubular stem 15 having a head 16 within the valve chamber, in which a ported valve seat member 17 is threaded at right angles to the axis of the stem as will clearly appear by an inspection of Figures 2 and 3.

The stem 15 is threaded into a boss 18 on the valve chamber, the latter having a boss provided with an outlet port 20 to which a hose 21 may be connected by a coupling member 22. The valve chamber is also provided on the upper side with a port 23 extending through a suitable boss into which the stem 24 of a gage or indicator 25 is screwed.

It will be observed in Figure 1 that the hose 21 is provided at its free end with a pressure reducer 26 and a suitable chuck 27 for engagement with a tire nipple. The specific construction of the pressure reducer 26 is not material to the invention herein disclosed but it may be assumed to be a pressure reducer such as that disclosed in my companion application, Serial Number 245,329 filed February 23, 1929.

This pressure reducer 26 has no means whereby the user may adjust it or vary its operation and it may be assumed to be capable of uniformly reducing the pressure approximately 25 pounds,— i. e., it will require a pressure in excess of 25 pounds in the service hose 21 to open the valve thereof against the predetermined resistance of its regulating spring or pressure reducing valve closing means. In stating that this pressure reducer is not adjustable, I wish to be understood as meaning that it is not adjustable by the ordinary operator or persons receiving the service.

The valve chamber 14 is of a generally cylindrical form, with one end flange 29 secured to the flanged margin of a spring chamber 30 by fastenings such as the screws 31, a flexible diaphragm 32 having its circular margin interposed between the flanges. The central portion of the diaphragm supports a cage 33 within the valve chamber to which a valve head 34 is attached and provided with a non-metallic valve 35 socketed in the head and seating against the open end of the ported valve seat 17. The valve head has a stem 38 socketed in a cap 39 which is screwed to the outer end of the cylindrical portion of the chamber 14, and a coiled spring 40 tends to hold the valve normally to its seat.

The spring chamber 30 has a reduced portion which extends through an aperture in the face plate 10 to which it is clamped by an exterior sleeve nut 45. This nut 45 has a reduced portion 46 into which a pressure regulating screw 47 is threaded. A coiled pressure regulating spring 50 is interposed between the inner end of this screw 47, and a plate 52 carried by the diaphragm. Suitable seating plates 53 and 54 receive the respective ends of the spring, the plate 54 having anti-friction bearings interposed at 55 between it and the end of the pressure regulating screw 47.

The pressure regulating screw 47 is adjusted inwardly or outwardly by rotating it in the reduced end portion 46 of the sleeve nut 45. Rotary movement in a direction for spring compression (clockwise direction) is transmitted to the screw from a manually operable crank 60 through the crank hub 61 and a pin or screw 62, the inner end of which operates in an annular channel 63 formed in the pressure regulating screw 47 but which in one position of adjustment engages a stop or pin 65 extending across the channel 63 in the path of the inner end of the screw. This crank connection permits relative rotative movement of the crank in the opposite direction (counterclockwise direction) for the purpose of relieving the pressure on the outlet side of the pressure regulating valve 35, preparatory to relieving the tension of the spring 50 as hereinafter explained.

It will be obvious from the foregoing description that the crank 60 may be operated in a clockwise direction to feed the screw 47 inwardly and increase the pressure of the spring 50 until the diaphragm 32 is flexed and the valve disc 35 pushed from its seat, thereby allowing air to pass through the valve seat into the outlet cavity 67 of the valve chamber until the pressure in said cavity becomes sufficient to flex the diaphragm 32 for a valve closing movement in the opposite direction against the pressure of the spring 50 as predetermined by the crank.

The air in the cavity 67 passes freely into the pressure indicator 25, which may be assumed to be a pressure indicator of any ordinary construction designed for a similar purpose and arranged to operate a pointer 70 over a circular indicator plate 71 provided with a suitable index. But the index plate is so adjusted or marked that the pointer 70 will be at the zero mark on the index when the pressure in the indicator equals that required for operation of the outlet pressure regulating valve 26. Therefore the indicator pointer will reach the zero mark on the dial when the pressure on the outlet side of the valve in valve cavity 67 does not exceed 25 pounds to the square inch in apparatus requiring 25 pounds pressure to open the valve of the pressure reducer 26 against the resistance of its spring.

It will be observed that the diaphragm plate 52 has a hub portion which is axially ported. One end 78 of this hub portion extends through a central aperture in the diaphragm and is threaded into the end of the cage 33 to support the cage and clamp it against the diaphragm. The other end 79 of the hub forms a support for the spring seating 53 and within the hub a relief valve 80 is mounted.

The relief valve 80 comprises a spring actuated valve seating with the pressure in the cavity 67 and I preferably use for this purpose a standard valve of the type commonly used in tire nipples. These valves have a stem 81 on the outlet side and the body is exteriorly threaded, whereby the valve structure may be screwed into the hub port 82 to a point where its stem 81 will project from the end of the hub portion 79 sufficiently for the purpose hereinafter explained, but in all respects the arrangement is substantially the same as that of the similar valves employed in tire nipples and further description of the valve structure is deemed unnecessary.

In order to operate the relief valve preparatory to an adjustment of the pressure regulator for delivering air or gas at reduced pressures, I provide means for opening this valve during a preliminary movement of the crank 60 in a counter-clockwise direction. During the initial movement of the crank 60 in that direction, the pin or screw 62 travels away from the stop pin 65 in the annular channel 63 and no motion is transmitted to the regulating screw 47 until a coiled spring 90, mounted in the hub 61 of the crank (Figure 5) has been compressed to such an extent that its pressure is sufficient to actuate the pin 65 and the sleeve 47, with which it is associated, in a direction opposite to that in which this pin and sleeve are actuated by the inner end of screw 62. It will be observed in Figure 5 that the spring 90 has one end bearing upon a threaded plug 91 from which it extends partially around the sleeve 47 with its other end bearing against the stop pin 65.

While the spring 90 is being compressed during a counter-clockwise movement of the crank, the motion of the crank will be transmitted to the valve stem 81 of the relief valve 80 through a set of friction discs 95 and 96, sleeve 92, cross pin 97, oscillatory shaft 98 and a cup shaped member 99 having a lead screw connection with the portion 79 of the hub, organized to cause an infeeding movement of the shaft 98 sufficient to bring the base of the cup into contact with the stem 81 of the relief valve to open the latter.

The friction disc 95 is seated against the end of the crank hub. The disc 96 preferably comprises an annular flange formed integrally with the sleeve 92. A coiled spring 102 is interposed between a shoulder on the regulating screw 47 and the flange or friction disc 96.

The cross pin 97 fits loosely between fork arms on the outer end of the oscillatory shaft 98, these arms being formed by slotting the end of the shaft, whereby the shaft may move longitudinally relative to the cross pin 97.

The cup shaped member 99 preferably has its side walls provided with arcuate helically curved slots 103 and 104 in which pins or studs 105 are loosely engaged, thereby forming in effect a lead screw structure, the helical pitch of the slots 103 and 104 being such that when the shaft 98 is rotated in a counter-clockwise direction, the shaft will feed inwardly toward the diaphragm 32 until the relief valve has been opened as above described.

As soon as the manual pressure upon the crank is relieved, the reaction of the spring 90 within its hub will turn it in the opposite direction sufficiently to retract shaft 98 and allow the relief valve to close, this closing of the relief valve being, therefore, entirely automatic.

If the pointer 70 shows a pressure higher than that desired by the user, the crank 60 may be moved in a clockwise direction to an extent greater than that desired for adjusting the spring 50 for the required ultimate pressure and then the user may rotate the crank 60 in counter-clockwise direction to move valve stem 81 to open position. The adjustment for pressure indication will then be accomplished as above described.

The entire structure of the adjustable pressure reducer and its indicator may be enclosed by a casing 105 and the face plate 10 with the exception of the clamping nut 45 adjusting screw 47 with its crank connection and associated parts, the indicator being visible through a window 107 which preferably comprises a circular piece of glass covering an aperture in the face plate. Therefore, the user or operator can do nothing with the apparatus except to adjust the crank in either clockwise or counter-clockwise direction, and the pointer will indicate the delivered pressure to be obtained by any given adjustment of the crank regardless of the actual pressure on either side of the regulating valve 35.

For example, assuming that the user desires to fill vehicle tires to a pressure of forty pounds to the square inch and he finds the pointer 70 indicating a pressure of twenty-five pounds as illustrated in Figure 4,—to obtain the desired pressure, he turns the crank 60 in a clockwise direction, thereby opening the regulating valve 35 and allowing air to escape into the cavity 67 until the indicator pointer moves to the numeral 40 on the dial 71. Thereupon he applies the chuck 27 to the tire nipple, whereupon air will be delivered until a pressure of forty pounds is attained within the tire. By employing a pressure reducer 26 which vibrates or otherwise signals that it is operating for air delivery as described in said companion application, the user will be advised when the desired pressure has been attained, although if he continues to hold the chuck to the tire nipple, no additional air will be delivered.

I claim:

1. In a pressure reducing apparatus having a valve casing provided with ported inlet and outlet cavities and a valve controlling communication between the cavities, the combination therewith of a spring pressed diaphragm subject to counter pressure in the outlet cavity and having a relatively small port therethrough provided with a relief valve, a screw for varying the spring pressure on the diaphragm, a manually operable handle for actuating the screw, said handle being free for limited independent movement, and means, responsive to independent movement of the handle in one direction, for opening the relief valve.

2. The combination with a main valve of a pressure reducing apparatus, of a centrally apertured diaphragm operatively connected with said main valve, a relief valve controlling deliveries through the diaphragm aperture, a spring adapted to urge the diaphragm toward main valve opening position, a manually adjustable abutment for one end of the spring, and a manually operable member for adjusting the abutment, said member being capable of limited independent movement, and said relief valve having connections adapted to transmit said independent movement in one direction to open the relief valve.

3. In a diaphragm controlled pressure regulator, the combination of an apertured diaphragm provided with a relief valve, a coiled spring in pressure relation to the diaphragm and provided with an adjustable abutment, a valve actuating rod extending axially through the spring and having lead screw connection with the diaphragm, a manually rotatable member in friction clutch connection with said rod, and means for transmitting a portion of the movement of the rotatable member to said abutment for adjustment thereof after opening the relief valve.

4. In a diaphragm controlled pressure regulator, the combination of an apertured diaphragm provided with a relief valve, a coiled spring in pressure relation to the diaphragm and provided with an adjustable abutment, a valve actuating rod extending axially through the spring and having lead screw connection with the diaphragm, a manually rotatable member in friction clutch connection with said rod, and means for transmitting a portion of the movement of the rotatable member to said abutment for adjustment thereof after opening the relief valve, said manually rotatable member being provided with a retracting spring adapted to automatically close the relief valve in any position of the abutment.

5. In a pressure reducing apparatus having a fixed inlet port, a spring actuated valve normally closing said port, a diaphragm subject to fluid pressure on the outlet side to said port and provided with an arm adapted to engage and push the valve to open position while allowing free movement of the valve to closed position when the diaphragm is retracted, a spring at the opposite side of the diaphragm having one end in pressure relation thereto and provided with an adjustable abutment at its other end, a manually rotatable member provided with means for adjusting the abutment during a portion of its rotary movement, a relief valve controlling deliveries from the outlet side of the main valve and connections for transmitting motion from another portion of the movement of said rotatable member to actuate the relief valve.

6. A pressure reducing apparatus having a main valve and a ported diaphragm controlling the main valve, a relief valve constructed for automatic closure in the diaphragm port, an actuating device for opening the relief valve and having lead screw connection with the diaphragm, and a rotatable, manually operable member for actuating said device in one direction.

7. A pressure reducing apparatus having a main valve and a ported diaphragm controlling the main valve, a relief valve in the diaphragm port, an actuating device for the relief valve having lead screw connection with the diaphragm, and a rotatable, manually operable member for actuating said device in one direction, together with means for utilizing said rotatable member to variably apply external pressure to the diaphragm.

ARNO A. EWALD.